United States Patent
Kreher et al.

(10) Patent No.: US 8,744,479 B2
(45) Date of Patent: Jun. 3, 2014

(54) METHOD AND LOCATING DEVICE FOR LOCATING AT LEAST ONE MOBILE RADIO SUBSCRIBER

(75) Inventors: Ralf Kreher, Berlin (DE); Martin Polak, Wandlitz (DE)

(73) Assignee: Tektronix International Sales GmbH, Neuhausen am Rheinfall (CH)

( * ) Notice: Subject to any disclaimer, the term of this patent is extended or adjusted under 35 U.S.C. 154(b) by 1029 days.

(21) Appl. No.: 12/548,283

(22) Filed: Aug. 26, 2009

(65) Prior Publication Data
US 2010/0056178 A1 Mar. 4, 2010

(30) Foreign Application Priority Data

Aug. 27, 2008 (EP) .................................. 08163104

(51) Int. Cl.
*H04W 24/00* (2009.01)
*H04W 68/00* (2009.01)
(52) U.S. Cl.
USPC ....................................... 455/456.1; 455/458
(58) Field of Classification Search
USPC .................................................... 455/456.1
See application file for complete search history.

(56) References Cited

U.S. PATENT DOCUMENTS

| | | | |
|---|---|---|---|
| 6,839,560 B1 | 1/2005 | Bahl et al. | |
| 6,873,852 B2 * | 3/2005 | Koorapaty et al. | 455/458 |
| 7,680,082 B2 * | 3/2010 | Lindoff | 370/333 |
| 2003/0008668 A1 | 1/2003 | Perez-Breva et al. | |
| 2007/0202887 A1 * | 8/2007 | Counts et al. | 455/456.1 |
| 2009/0219209 A1 * | 9/2009 | Bush et al. | 342/450 |
| 2011/0039580 A1 * | 2/2011 | Wigren et al. | 455/456.1 |

FOREIGN PATENT DOCUMENTS

| | | |
|---|---|---|
| EP | 2 160 064 A1 | 3/2010 |
| WO | WO 2005/034558 A1 | 4/2005 |

OTHER PUBLICATIONS

Forsk, "Atoll RF Planning & Optimisation Software," version 2.7, Jan. 2008, XP-002512057.

* cited by examiner

*Primary Examiner* — Charles Appiah
*Assistant Examiner* — Natasha Cosme
(74) *Attorney, Agent, or Firm* — Edwards Wildman Palmer LLP; Christopher J. Capelli; Scott D. Wofsy

(57) ABSTRACT

The present invention relates to a method for locating at least one mobile radio subscriber in a mobile radio network. The mobile radio subscriber transmits a measurement report that includes an itemization identifying at least two transmitting stations. A value correlated with the receive field strength of a signal from the transmitting stations is allocated to each transmitting station. A table is organized according to geographic units of a presettable area. A pre-calculated value correlated with the receive field strength of a signal from a transmitting station is allocated to each transmitting station. The transmitting stations are organized according to the values correlated with the receive field strength of the signal from the respective transmitting station. The location of the mobile radio subscriber is determined based on the geographic unit meeting at least one presettable criterion.

16 Claims, 3 Drawing Sheets

```
┌─────────────┬──────────────────────────────────────────────┬──────────────────────────┐
│ BITMASK     │ ID Name                                      │ Comment or Value         │
└─────────────┴──────────────────────────────────────────────┴──────────────────────────┘
TS 25.3311 DCCH-UL (2002-03) (RRC_DCCH_UL) measurementReport (=measurementReport)
uL-DCCH-Message
2.1 measurementReport 2.1.2.1.1.2.1.1 primaryCDICH-Info
  *b9*   |2.1.2.1.1.2.1.1.1 primaryScramblingCod   |20
  -011000-   |2.1.2.1.1.2.1.2 cpich-Ec-N0              |24
  *b7*   |2.1.2.1.1.2.1.3 cpich-RSCP               |11

2.1.2.1.2.2.1.1 primaryCDICH-Info
  *b9*   |2.1.2.1.2.2.1.1.1 primaryScramblingCod   |386
  *b6*   |2.1.2.1.2.2.1.2 cpich-Ec-N0              |24
  *b7*   |2.1.2.1.2.2.1.3 cpich-RSCP               |11

2.1.2.1.3.2.1.1 primaryCDICH-Info
  *b9*   |2.1.2.1.3.2.1.1.1 primaryScramblingCod   |361
  *b6*   |2.1.2.1.3.2.1.2 cpich-Ec-N0              |23
  *b7*   |2.1.2.1.3.2.1.3 cpich-RSCP               |10

2.1.2.1.4.2.1.1 primaryCDICH-Info
  *b9*   |2.1.2.1.4.2.1.1.1 primaryScramblingCod   |385
  --010100   |2.1.2.1.4.2.1.2 cpich-Ec-N0              |20
  0001000-   |2.1.2.1.4.2.1.3 cpich-RSCP               |8

2.1.2.1.5.2.1.1 primaryCDICH-Info
  *b9*   |2.1.2.1.5.2.1.1.1 primaryScramblingCod   |280
  *b6*   |2.1.2.1.5.2.1.2 cpich-Ec-N0              |14
  *b7*   |2.1.2.1.5.2.1.3 cpich-RSCP               |6

2.1.2.1.6.2.1.1 primaryCDICH-Info
  *b9*   |2.1.2.1.6.2.1.1.1 primaryScramblingCod   |19
  001000--   |2.1.2.1.6.2.1.2 cpich-Ec-N0              |8
  *b7*   |2.1.2.1.6.2.1.3 cpich-RSCP               |3
```

Fig.1

Longitude →

| BIN1 | BIN2 | BIN3 |
|---|---|---|
| PSC 20<br>PSC 386<br>PSC 361<br>PSC 385<br>PSC 280<br>PSC 19 | PSC 20<br>PSC 386<br>PSC 361<br>PSC 19<br>PSC 385<br>PSC 280 | PSC 386<br>PSC 20<br>PSC 361<br>PSC 19<br>PSC 385<br>PSC 280 |
| PSC 20<br>PSC 361<br>PSC 386<br>PSC 385<br>PSC 280<br>PSC 19 | PSC 20<br>PSC 361<br>PSC 386<br>PSC 19<br>PSC 385<br>PSC 280 | PSC 386<br>PSC 361<br>PSC 20<br>PSC 19<br>PSC 385<br>PSC 280 |
| BIN4 | BIN5 | BIN6 |

Latitude ↓

Fig.2

METHOD AND LOCATING DEVICE FOR LOCATING AT LEAST ONE MOBILE RADIO SUBSCRIBER

CROSS-REFERENCE TO RELATED APPLICATIONS

The present application claims the benefit of the filing date of European patent application serial no. 08163104.6, filed Aug. 27, 2008, the disclosure of which is hereby incorporated by reference herein in its entirety.

SUMMARY OF THE INVENTION

The present invention relates to a method for location of at least one mobile radio subscriber in a mobile radio network, wherein the at least one mobile radio subscriber transmits at least once a measurement report with and/or without active mobile radio link in the mobile radio network, wherein an itemization is provided in the measurement report, which includes at least two transmitting stations, wherein to each transmitting station a value correlated with the receive field strength of a signal from this transmitting station is allocated. Moreover, it relates to a corresponding locating device as well as a computer program product for performing the method.

The location of mobile radio subscribers with high accuracy is of high importance for various reasons. Mobile radio subscribers move almost uncorrelated in the area, while services of a mobile radio provider can be used. If a problem with the link, for example a call termination, occurs, thus, it is extraordinarily important for the provider to localise the location at which the problem has occurred. For example, such problems are embraced by the term coverage problems.

An approach known from the prior art provides to determine the position of a mobile radio subscriber in passive monitoring on the IuB interface by evaluating a certain measurement value reported to the mobile radio network by the mobile radio apparatus. In the UMTS network, this is the CPICH RSCP measurement value. Herein, CPICH denotes the Common Pilot Channel, i.e. a signal radiated with constant power, especially 2 W, from a base station, actually a NodeB. RSCP signifies Received Signal Code Power and indicates the level, with which the CPICH signal has been received by the mobile radio apparatus. Alternatively, the RSCP value is measured with respect to the noise and transmitted to the base station. The value resulting therein is known under the designation Ec/No, wherein this abbreviation signifies Chip Energy Over Noise.

By way of the CPICH RSCP or Ec/No value, by means of wave propagation models, the position of the mobile radio subscriber can be calculated from case to case. A known wave propagation model is known under the designation COST HATA. Such wave propagation models are created for certain environments by elaborate methods, for example for the midtown of Tokyo, for the midtown of Berlin etc. By such wave propagation models, the level of the RSCP or the Ec/No measurement value otherwise approximately exponentially declining with the distance is specified slightly more exactly such that a coarse estimation of the position of the mobile radio subscriber is possible at least for environments for which such models exist. Despite all that, the potential whereabouts resulting for the mobile radio subscriber remains undesirably large.

Therefore, the object of the present invention is to provide a method as well as a locating device for locating at least one mobile radio subscriber and a corresponding computer program product for performing the method, with which location of a mobile radio subscriber as exactly as possible is allowed with effort as low as possible.

This object is solved by a method having the features according to claim 1, a locating device having the features of claim 9 as well as a computer program product having the features of claim 10.

The present invention is based on the realization that the above object can be optimally solved if measurement results to be expected are used, which have been calculated beforehand by means of a radio network planning tool known from the prior art. Radio network planning tools such as for example the program Atoll of the company Forsk, Blagnac, France, allow a provider, for geographic units of a presettable geographic area, to calculate beforehand the receive field strength to be expected of the transmitting stations to be received in the geographic unit in order to ensure supply as gapless as possible therewith. Therein, parameters crucial for calculation of the wave propagation such as the topographic character of the area, height of the base station, development of the area etc. are taken into account. The mentioned program for example provides the measurement results to be expected with a resolution of 24 m×24 m.

In the following, such geographic units are referred to as "BIN". In the following, the data provided by such a radio network planning tool are designated with the name multi server map. In such a multi server map, the expected signal levels of up to six cells overlapping each other are stored for each geographic unit of a certain radio network. Therein, in the following, the smallest addressable unit is referred to as cell independently of the allocation of this term in the mobile radio domain. In an UMTS network, for example, the complete radiation environment, i.e. 360°, of a base station referred to as NodeB there, is divided in up to six separated regions. A certain identification is associated with each of these regions such that each one of these regions is to be comprehended as the smallest addressable unit, i.e. cell, within the meaning of the following explanations, although the transmitting station allocated to each region is the same. The corresponding applies to other network standards, for example a GSM network. In the following, a BIN can correspond to a cell, but this must not be the case. Usually, a cell is multiple times greater than a BIN.

Accordingly, such a multi server map is imported by a locating device according to the invention and thus is available as a reference raster, which allows to allocate each arbitrary event, for example a connection abort, or measurement values taken in the course of a call to the position of the mobile radio subscriber and subsequently to represent it graphically. This is successful since the receive field strengths, however the actual ones, of the signal from a plurality of transmitting stations are also contained in the measurement report. If both the transmitting stations in the measurement report and the transmitting stations of the multi server map are now organised and the results of organization are compared, thus, the mobile radio subscriber can be allocated to a certain geographic unit, namely that one, in which correspondence according to at least one presettable criterion has arisen. Therein, the accuracy of the determination of position is appreciably higher than in the method known from the prior art, since now parameters such as topographic character of the area, height of the base station, development of the area etc. have entered into the pre-calculation. Additionally, the computationally expensive calculation of the position by means of complex formulas is omitted, which significantly accelerates the data processing and allows bulk analysis of data for the purpose of radio network optimisation.

In a preferred embodiment, the presettable criterion is in that the order of the transmitting stations organised according to the receive field strength starting from the transmitting station having the greatest receive field strength is identical for a presettable number of transmitting stations, especially for a number of transmitting stations as great as possible. Accordingly, the transmitting stations are organised according to the receive field strength in the multi server map and also in the measurement report. By simple comparison, it can be checked for correspondence, and thus the location of the mobile radio subscriber can be allocated to a geographic unit.

Preferably, the mobile radio network is an UMTS network, wherein the value correlated with the receive field strength is the RSCP value or the Ec/No value. Alternatively, it can be a GSM network, wherein the value correlated with the receive field strength is the GSMRSSI value. Finally, the invention also particularly comes into consideration in an LTE network, wherein the value correlated with the receive field strength is then the RSRP (Reference Signal Received Power) or the RSRQ (Reference Signal Received Quality) value.

In the pre-calculation of the values of the table, at least one of the following parameters is taken into account: topographic character of the area, height of the base station, development of the area. The more of these parameters are taken into account, the more exactly the theoretic, pre-calculated values of the multi server map correspond to the actual measurement values delivered in the measurement report. Therewith, all the more exact location of the mobile radio subscriber is then possible.

Although, in the above explanations, it has been assumed that the pre-calculated values represent radio network planning data, thus, naturally, other sources can also come into consideration for this. However, radio network planning data is particularly advantageous because it is very exact and has already been acquired—by someone else for other purposes—and is present in an electronically processable format.

The geographic units are preferably squares with a presettable edge length, especially between 20 and 550 m, preferably 100 m.

Preferably, the method is performed on the IuB interface or a superordinate interface of the mobile radio network, especially a base station, a NodeB, an eNodeB, an RNC or an MME.

Preferably, the transmission report includes all of the transmitting stations receivable at the actual location of the mobile radio subscriber, wherein the provided table includes all of the transmitting stations receivable in the respective geographic unit, respectively. The more transmitting stations are encompassed by the measurement report or the table, respectively, the more uniquely an allocation can be made and the more accurate the location of the mobile radio subscriber can be determined therewith.

Further advantageous embodiments are apparent from the dependent claims.

The preferred embodiments presented with respect to the method according to the invention and the advantages thereof apply correspondingly, if applicable, to a locating device according to the invention and a computer program product according to the invention.

BRIEF DESCRIPTION OF THE DRAWINGS

In the following, an embodiment of a method according to the invention is now described in more detail with reference to the attached drawings, which show:

FIG. 1 is a measurement report transmitted by a mobile radio apparatus as it is present on the IuB interface;

FIG. 2 is a multi server map with exemplarily six geographic units, wherein the geographic units are arranged according to longitude and latitude;

DETAILED DESCRIPTION OF THE INVENTION

FIG. 1 exemplarily shows a measurement report, i.e. a measurement report, which a mobile radio device has transmitted to a base station as it is present on the IuB interface. It includes the receive field strengths for an Ec/No signal 24, 24, 23, 20, 14, 8 as well as an RSCP signal 11, 11, 10, 8, 6, 3, respectively, for six cells (primary scrambling code=PSC) 20, 386, 361, 385, 280, 19. As appears from the measurement report, the cells are already organised in the order of the receive field strength starting from the cell having the greatest receive field strength up to the cell having the lowest receive field strength. Since the order resulting from organization of the Ec/No value can differ from that resulting from organization according to the RSCP value, but which is actually not the case, a corresponding multi server map is to be used, which has been calculated for the corresponding signal, thus Ec/No or RSCP.

FIG. 2 shows such a multi server map, wherein actually an abstract of six BINs 1 to 6 is represented, which are arranged according to their spatial arrangement, i.e. sorted according to longitude and latitude. The transmitting stations receivable in the respective BIN are registered in each BIN 1 to 6 by a radio network planning tool, for example the product Atoll of the company Forsk, organised from the transmitting station having the highest receive field strength to the transmitting station having the lowest receive field strength. As is clearly recognizable, the order of the transmitting stations differs from BIN to BIN. A comparison with the order in the measurement report of FIG. 1 reveals that only the black shaded BIN has the same order. Accordingly, the mobile radio subscriber is located in this BIN, which is uniquely identified by longitude and latitude.

Figure 3:
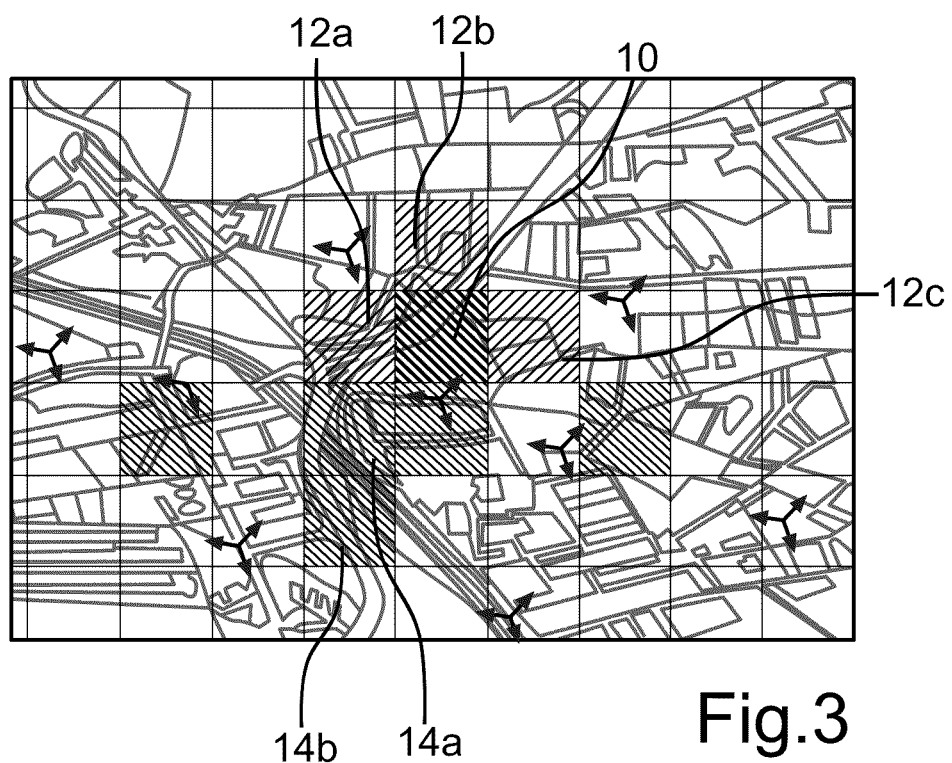
FIG. 3 is a screen shot showing a map superimposed with a statistic about call terminations.

FIG. 3 shows a section of a screen shot of a display device 20 of a locating device according to the invention, wherein bins are displayed as squares based on the locating method according to the invention. Therein, the squares are coloured according to a number of connection aborts, which have been detected in a presettable time period in this bin. Accordingly, in the square 10, more than 30 connection aborts have been detected over a time period of 12 hours, while in the squares 12a, 12b, 12c between 10 and 20 connection aborts have each been detected in the same time period. The number of the connection aborts in the squares 14a, 14b is below 10 connection aborts per 12 hours.

Moreover, the locating device is formed such that if one moves on one of the squares 10, 12i, 14i with the cursor, one obtains further detailed information to the respective bin, for example how many calls have been tracked in total, how many calls have been aborted and what calls they are. By clicking on the corresponding listed call, further information to the call and to the individual error can be inquired, for example start time, stop time, call duration, number of the mobile radio subscriber, called number, handset type, reason for the connection abort etc.

Figure 4:
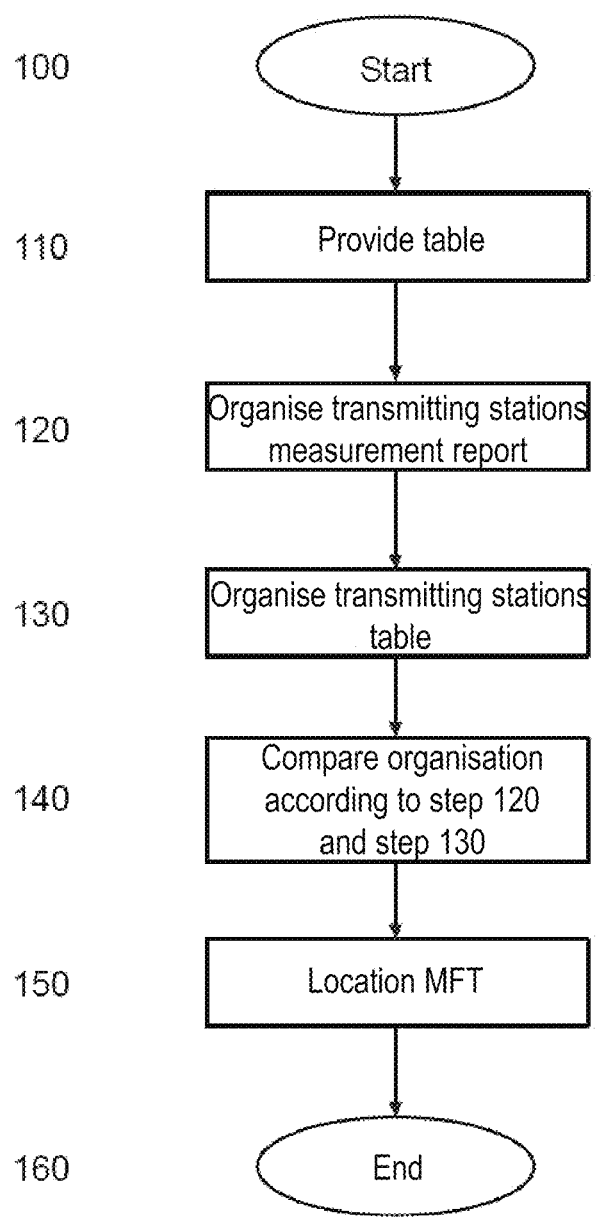
FIG. 4 is a schematic representation of a signal flow graph concerning a method according to the invention.

FIG. 4 once again shows in schematic representation a signal flow graph concerning the method according to the invention. It begins in step 100. First, in step 110, a table is provided, which is organised according to geographic units of a presettable geographic area, wherein an itemization is provided for each geographic unit, which includes at least two transmitting stations, wherein to each transmitting station a pre-calculated value correlated with the receive field strength of a signal from this transmitting station in the respective geographic unit is allocated. In step 120, the transmitting stations in the measurement report are organised according to the values correlated with the receive field strength of the signal from the respective transmitting station. In step 130, now, the transmitting stations are also organised for each geographic unit according to the values correlated with the receive field strength of the signal from the respective transmitting station. Subsequently, in step 140, the results of organization of the steps 120 and 130 are compared. By determining a correspondence according to at least one presettable criterion, in step 150, the location of the mobile radio subscriber is allocated to a geographic unit. The method terminates in step 160.

The invention claimed is:

1. A method for locating at least one mobile radio subscriber in a mobile radio network,
wherein the at least one mobile radio subscriber, with and/or without an active mobile radio link, transmits, at least once, a measurement report in the mobile radio network, wherein an itemization is provided in the measurement report that identifies at least two transmitting stations, wherein a value correlated with the receive field strength of a signal from this transmitting station is allocated to each transmitting station, comprising the steps of:
a) providing a table organized according to geographic units of a presettable geographic area, wherein an itemization is provided for each geographic unit, which includes at least two transmitting stations, wherein to each transmitting station a pre-calculated value correlated with the receive field strength of a signal from this transmitting station in the respective geographic unit is allocated, the pre-calculated value based on radio network planning data;
b) organizing the transmitting stations in the measurement report according to the values correlated with the receive field strength of the signal from the respective transmitting station;
c) for each geographic unit, organizing the transmitting stations according to the values correlated with the receive field strength of the signal from the respective transmitting station;
d) comparing the results of organization of step b) and step c); and
e) allocating the location of the mobile radio subscriber to the geographic unit in which the comparison according to step d) has resulted in a correspondence according to at least one presettable criterion wherein in the pre-calculation of the values of the table, at least the parameters of the height of the transmitting station is taken into account.

2. The method according to claim 1, further comprising: the presettable criterion is that the order of the transmitting stations is organized according to the receive field strength, starting from the transmitting station having the greatest receive field strength.

3. The method according to claim 1, further comprising: the mobile radio network is an UMTS network, wherein the value correlated with the receive field strength is the RSP value or the Ec/No value.

4. The method according to claim 1, further comprising: the mobile radio network is a GSM network, wherein the value correlated with the receive field strength is the GSMRS SI value.

5. The method according to claim 1, further comprising: the mobile radio network is an LTE network, wherein the value correlated with the receive field strength is the RSRP or the RSRQ value.

6. The method of claim 1, further comprising: the geographic units are squares with a presettable edge length between 20 and 550 m.

7. The method of claim 1, further comprising: the method is performed on the TuB interface or a superordinate interface of the mobile radio network at a base station, a NodeB, an eNodeB, an RNC or an MME.

8. The method of claim 1, further comprising: the measurement report includes all of the transmitting stations receivable at the actual location of the mobile radio subscriber, wherein the provided table includes all of the transmitting stations receivable in the respective geographic unit.

9. A locating device for locating at least one mobile radio subscriber in a mobile radio network, wherein the at least one mobile radio subscriber, with and/or without active mobile radio link, transmits at least once a measurement report in the mobile radio network, wherein an itemization is provided in the measurement report, which includes at least two transmitting stations, wherein a value correlated with the receive field strength of a signal from a transmitting station is allocated to each transmitting station, comprising:
a storage device associated with the locating device, in which a table is stored, which is organized according to geographic units of a presettable geographic area, wherein an itemization is provided for each geographic unit, which includes at least two transmitting stations, wherein to each transmitting station a pre-calculated value correlated with the receive field strength of a signal from this transmitting station in the respective geographic unit is allocated, the pre-calculated value based on radio network planning data;
the locating device configured to
a) organize the transmitting stations in the measurement report according to the values correlated with the receive field strength of the signal from the respective transmitting station;
b) for each geographic unit, organize the transmitting stations according to the values correlated with the receive field strength of the signal from the respective transmitting station;
c) compare the respective results of organization; and
d) allocate the geographic unit to the location of the mobile radio subscriber, in which the comparison has resulted in a correspondence according to at least one presettable criterion wherein in the pre-calculation of the values of the table, at least the parameters of the area height of the transmitting station is taken into account.

10. A method for locating at least one mobile radio subscriber in a mobile radio network, wherein the at least one mobile radio subscriber, with and/or without an active mobile radio link, transmits, at least once, a measurement report in the mobile radio network, wherein an itemization is provided in the measurement report that identifies at least two transmitting stations, wherein a value correlated with the receive field strength of a signal from this transmitting station is allocated to each transmitting station, comprising the steps of:

a) providing a table organized according to geographic units wherein the geographic units are squares with a presettable edge length between 20 and 550 m, wherein an itemization is provided for each geographic unit, which includes at least two transmitting stations, wherein to each transmitting station a pre-calculated value correlated with the receive field strength of a signal from this transmitting station in the respective geographic unit is allocated, the pre-calculated value based on radio network planning data;

b) organizing the transmitting stations in the measurement report according to the values correlated with the receive field strength of the signal from the respective transmitting station;

c) for each geographic unit, organizing the transmitting stations according to the values correlated with the receive field strength of the signal from the respective transmitting station;

d) comparing the results of organization of step b) and step c); and e) allocating the location of the mobile radio subscriber to the geographic unit in which the comparison according to step d) has resulted in a correspondence according to at least one presettable criterion.

11. The method according to claim 10, further comprising: the presettable criterion is that the order of the transmitting stations is organized according to the receive field strength, starting from the transmitting station having the greatest receive field strength.

12. The method according to claim 10, further comprising: the mobile radio network is an UMTS network, wherein the value correlated with the receive field strength is the RSCP value or the Ec/No value.

13. The method according to claim 10, further comprising: the mobile radio network is a GSM network, wherein the value correlated with the receive field strength is the GSMRS SI value.

14. The method according to claim 10, further comprising: the mobile radio network is an LTE network, wherein the value correlated with the receive field strength is the RSRP or the RSRQ value.

15. The method of claim 10, further comprising: the method is performed on the TuB interface or a superordinate interface of the mobile radio network at a base station, a NodeB, an eNodeB, an RNC or an MME.

16. The method of claim 10, further comprising: the measurement report includes all of the transmitting stations receivable at the actual location of the mobile radio subscriber, wherein the provided table includes all of the transmitting stations receivable in the respective geographic unit.

* * * * *

UNITED STATES PATENT AND TRADEMARK OFFICE
CERTIFICATE OF CORRECTION

| | | |
|---|---|---|
| PATENT NO. | : 8,744,479 B2 | Page 1 of 1 |
| APPLICATION NO. | : 12/548283 | |
| DATED | : June 3, 2014 | |
| INVENTOR(S) | : Ralf Kreher et al. | |

It is certified that error appears in the above-identified patent and that said Letters Patent is hereby corrected as shown below:

In the Claims

At column 5, claim number 3, line number 67, change "RSP" to --RSCP--;

At column 6, claim number 9, line number 57, delete "area".

Signed and Sealed this
Twelfth Day of August, 2014

Michelle K. Lee
*Deputy Director of the United States Patent and Trademark Office*